US010796416B2

(12) United States Patent
Rathore et al.

(10) Patent No.: US 10,796,416 B2
(45) Date of Patent: Oct. 6, 2020

(54) RECOLORED COLLAGE GENERATION BASED ON COLOR HUE DISTANCES

(71) Applicant: Adobe Inc., San Jose, CA (US)

(72) Inventors: Shailendra Singh Rathore, Jodhpur (IN); Anmol Dhawan, Ghaziabad (IN); Anant Jain, New Delhi (IN)

(73) Assignee: ADOBE INC., San Jose, CA (US)

( * ) Notice: Subject to any disclaimer, the term of this patent is extended or adjusted under 35 U.S.C. 154(b) by 143 days.

(21) Appl. No.: 16/001,829

(22) Filed: Jun. 6, 2018

(65) Prior Publication Data

US 2019/0378249 A1 Dec. 12, 2019

(51) Int. Cl.
*G06T 5/00* (2006.01)
*G06K 9/46* (2006.01)
*G06T 5/50* (2006.01)
*G06T 11/60* (2006.01)
*G06K 9/62* (2006.01)

(52) U.S. Cl.
CPC ............ *G06T 5/005* (2013.01); *G06K 9/4652* (2013.01); *G06K 9/6223* (2013.01); *G06T 5/50* (2013.01); *G06T 11/60* (2013.01); *G06T 2207/10024* (2013.01)

(58) Field of Classification Search
CPC ........... G06T 5/00; G06T 5/005; G06T 5/007; G06T 5/50; G06T 5/20; G06T 11/60; G06T 11/00; G06K 9/4652; G06K 9/4642; G06K 9/00234; G06K 9/00241
USPC .................. 382/162–167, 171, 173
See application file for complete search history.

(56) References Cited

U.S. PATENT DOCUMENTS

| 7,382,899 B2 * | 6/2008 | Varekamp | G06T 7/20 375/E7.081 |
| 7,808,531 B2 * | 10/2010 | Kim | H04N 9/73 348/223.1 |
| 2013/0182002 A1 * | 7/2013 | Macciola | G06K 9/00463 345/589 |
| 2016/0048949 A1 * | 2/2016 | Peng | H04N 1/628 382/162 |

FOREIGN PATENT DOCUMENTS

JP 2014049780 A * 3/2014

* cited by examiner

*Primary Examiner* — Dwayne D Bost
*Assistant Examiner* — Stephen M Brinich
(74) *Attorney, Agent, or Firm* — Kilpatrick Townsend & Stockton LLP

(57) ABSTRACT

Certain embodiments involve generating recolored collages. For example, a method includes receiving a first image from and a second image. The method also includes grouping color hues within the first image into a first color hue cluster, and grouping color hues within the second image into a second color hue cluster. Further, the method includes determining that a first hue center of the first color hue cluster is within a distance range of a second hue center of the second color hue cluster. Additionally, the method includes generating a first recolored image by recoloring pixels of the first image having color hues outside the first color hue cluster and generating a second recolored image by recoloring pixels of the second image having color hues outside the second color hue cluster. Moreover, the method includes outputting a recolored collage including the first recolored image and the second recolored image.

20 Claims, 8 Drawing Sheets
(4 of 8 Drawing Sheet(s) Filed in Color)

RECOLORED COLLAGE GENERATION BASED ON COLOR HUE DISTANCES

TECHNICAL FIELD

This disclosure relates generally to image manipulation systems and methods that transform input images into recolored collages. More specifically, but not by way of limitation, this disclosure relates to generating a recolored collage using color hue grouping operations and color hue distance measurements performed on input images.

BACKGROUND

Image collage generation provides an artistic presentation of a set of images by arranging the set of images in proximity to one another and providing the arranged set of images as a single artistic expression. The image collages are sometimes recolored to emphasize more important colors or features in the artistic presentation. Image manipulation applications include features that generate collages based on images selected by a user. In one example, the image manipulation application includes automated features that generate collages based on analyzing the content and color of images selected by a user for the collage.

Existing applications that generate collages rely heavily on user input to produce the final collage output. In one example, the user input includes manually modifying color features of the selected images through a series of interactions. For example a "popped" color emphasized in the collage output may be limited to a fixed set of colors and a fixed set of ranges within those colors. However, images may contain color features that existing applications are unable to emphasize due to theses fixed set of colors and ranges within the colors that are available for emphasis within the existing applications. Alternatively, the user is required to manually identify a fixed range of colors for emphasis. These requirements limit the options for recoloring or otherwise emphasizing certain image features. Further, heavy reliance on user input increases opportunities for user error and user frustration.

SUMMARY

Certain embodiments involve generating a recolored collage using color hue grouping operations and color hue distance measurements performed on input images. For example, a method for modifying image content based on color information computed for a set of collage images includes one or more processing devices performing operations. The operations include receiving a first image from the set of collage images and a second image from the set of collage images. The operations also include grouping color hues within the first image into a first color hue cluster, and grouping color hues within the second image into a second color hue cluster. Further, the operations include determining that a first hue center of the first color hue cluster is within a distance range of a second hue center of the second color hue cluster. Additionally, the operations include generating a first recolored image by recoloring pixels of the first image having color hues outside the first color hue cluster, and the operations include generating a second recolored image by recoloring pixels of the second image having color hues outside the second color hue cluster. Moreover, the operations include outputting a recolored collage including the first recolored image and the second recolored image.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings. The patent or application file contains at least one drawing executed in color. Copies of this patent or patent application publication with color drawing(s) will be provided by the Office upon request and payment of the necessary fee.

DETAILED DESCRIPTION

Figure 1:
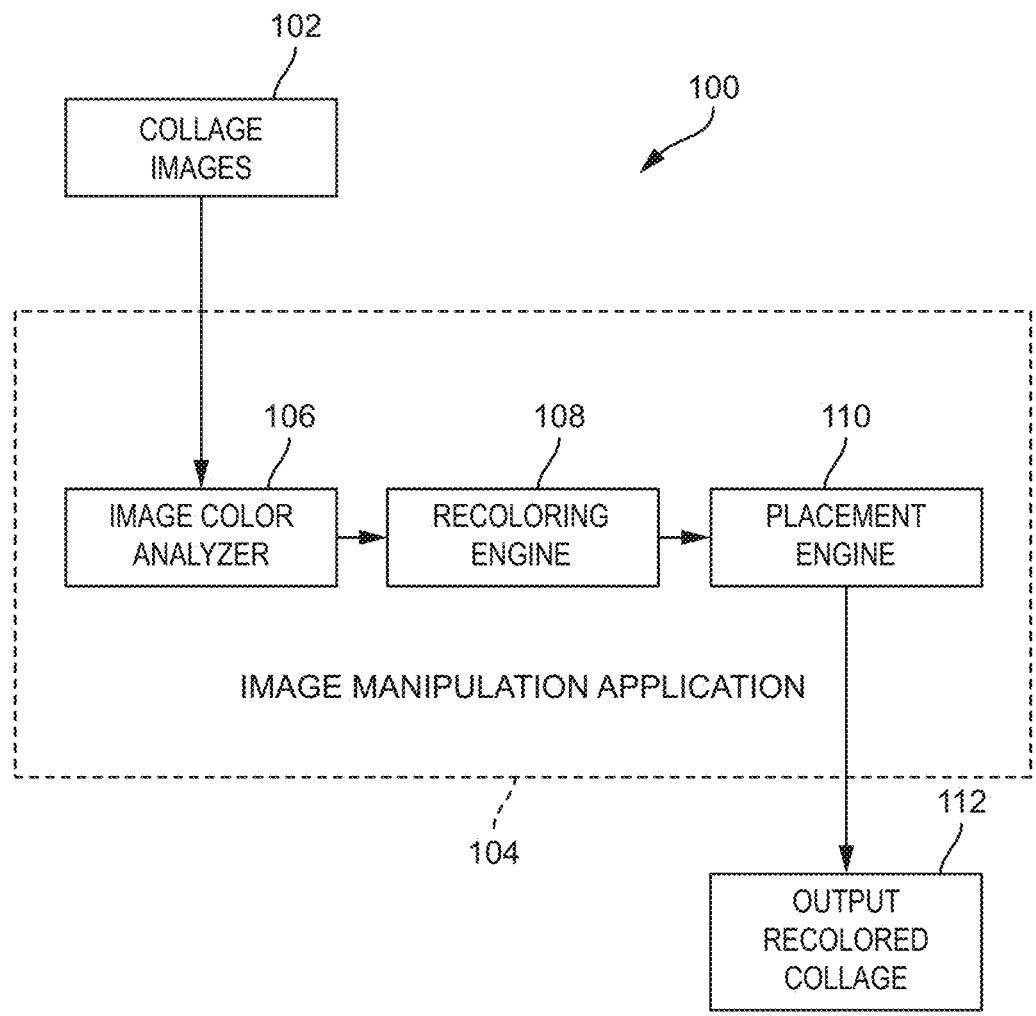
FIG. 1 depicts an example of a computing environment for recoloring images to generate a recolored collage output, according to certain embodiments of the present disclosure.

Certain embodiments involve using an image manipulation application to generate a recolored collage using color hue grouping operations and color hue distance measurements performed on input images. As explained above, conventional solutions for generating customized collages rely heavily on user input and limited recoloring options selectable by the user. Certain embodiments described herein address this issue by, for example, automatically identifying color hues in images input into an image manipulation application and identifying similar identified color hues across the input images. For instance, a set of input images received by an image manipulation application may each include similar hues of green. By identifying the similar hues of green across the set of input images, the image manipulation application is able to generate a recolored collage of the input images that emphasizes the similar hues in the input images. In some embodiments, identifying these hues and emphasizing similar hues in an automated manner reduces the amount of manual user interaction required for recoloring collages, thereby increasing efficiency and decreasing user error that is disruptive to completion of the recolored collage.

The following non-limiting example is provided to introduce certain embodiments. In this example, an image manipulation system having one or more processing devices executes image manipulation modules to manipulate images received by the image manipulation system. The image manipulation system receives a set of collage images that are modified based on color information. The set of collage images may be any images that include at least some variance in color hue. The image manipulation module groups color hues within each image of the set of collage images into a number of color hue clusters. For example, in the collage images, the colors within a specified range of a set of base colors (e.g., within a specified color distance of red, green, and/or blue) are identified and sorted into the color hue clusters associated with the base colors.

A number of color hue clusters in each image is variable based on how similar a hue center of the color hue clusters will be across each of the images. For example, a hue center is an average color value within one of the color hue clusters. When the color hues of the images are grouped into a larger number of color hue clusters, the hue centers have less variation and, thus, a closer match to hue centers of the other images. That is, hue centers of color hue clusters having a same color range in two different images may be closer in similarity to each other when the two images are divided into a larger overall number of color hue clusters than when the two images are divided into a smaller overall number of color hue clusters.

Continuing with this example, the image manipulation module also determines the hue center of each color hue cluster. The hue center is represented by an average color of pixels included within each hue cluster. In an example, when the pixels clustered into a red hue cluster include a majority of orange hued pixels, the hue center of the red hue cluster skews toward an orange color. The image manipulation module determines distances from the hue centers of one image of the set of collage images to the hue centers of the other images of the set of collage images. The image manipulation module also compares these distances to a distance threshold to determine which of the color hue clusters will remain when the set of collage images are recolored. If the hue centers are within a distance range of the distance threshold, the image manipulation module maintains a color of pixels within color hue clusters associated with the hue centers. Further, the image manipulation module recolors the remaining pixels that are not within the color hue clusters associated with the hue centers. The image manipulation system outputs the recolored images as a recolored collage.

Certain embodiments described herein facilitate using automated image manipulation applications for generating recolored collages to emphasize similar color hues across input images used in the recolored collages. Examples of the automated image manipulation applications include one or more processors capable of executing instructions associated with identifying color hues, recoloring images, and placing images in a collage arrangement. Generation of the recolored collages provides automatic emphasis to a portion of the image without reliance on user input. The use of the automated image manipulation applications in this manner provides an improvement to an existing technological process.

Example of an Operating Environment for Automatically Generating a Recolored Collage Referring now to the drawings, FIG. 1 depicts an example of a computing environment 100 for recoloring input collage images 102 to generate a recolored collage output. The computing environment includes an image manipulation application 104, which is executed by one or more computing devices. The image manipulation application 104 includes an image color analyzer 106, a recoloring engine 108, and a placement engine 110.

The image color analyzer 106 receives the input collage images 102 to automatically analyze color hues present within the input collage images 102. In one example, the input collage images 102 are provided to the image manipulation application 104 by a user. In another example, the input collage images 102 are randomly selected from a bank of images stored in a memory associated with the computing environment 100. The input collage images 102 represent a set of at least two images used as input material for a recolored collage.

The image color analyzer 106 of the image manipulation application 104 performs operations on the input collage images 102 that filter out pixel data not relevant to determining cluster of hues within the input collage images 102. Additionally, the image color analyzer performs a k-means clustering operation on the input collage images 102 to cluster the pixels of the input collage images 102 into color hue clusters and to identify color hues representative of a central color of the color hue clusters. In an example, the image color analyzer 106 performs a distance measurement between the central colors of the color hue clusters of the input collage images 102 to identify color hue clusters that should be emphasized in the recolored collage. In such an example, the image color analyzer 106 includes a threshold distance. When the distance between the central colors is less than the threshold distance, the image color analyzer 106 identifies the central colors as potential recoloring options for the recolored collage. When the distance between the central colors is greater than the threshold distance, the image color analyzer 106 discards the possibility of using the central colors as a potential recoloring option.

In an example where each of the input collage images 102 includes a central color that is a green or yellow-green hue, the distance between such central colors is less than the distance threshold of the image color analyzer 106. In an example where one of the input collage images 102 includes a central color that is a green hue, and another of the input collage images 102 includes a central color that is a red hue, the distance between such central colors is greater than the distance threshold of the image color analyzer 106. A value of the distance threshold 106 is dependent on preferences of a user as to how similar emphasized portions of the recolored collage should be. For example, a hue, saturation, and lightness (HSL) color wheel may represent a full spectrum of colors across the 360 degree wheel. In the HSL color wheel a distance between green and yellow is approximately 60 degrees. Accordingly, a user preferring to keep the emphasized color hues close across all images may set the threshold distance to 10 degrees, while a user less concerned about color proximity of the emphasized color hues may set the threshold distance to 45 degrees or more. In one example, the image color analyzer 106 sets a default distance threshold to a 20 degree interval on the HSL color wheel.

Upon identifying color hue clusters of the input collage images 102, the input collage images 102 are provided to the recoloring engine 108, which performs a recoloring operation on the input collage images 102. In an example, the recoloring operation of the recoloring engine 108 converts all of the pixels that do not fall within the identified color hue clusters to grayscale while maintaining the original color hue of the pixels that do fall within the identified color hue cluster. The resulting images include a color "pop" because only the selected color hue clusters of the input collage images 102 remain.

In an example, the recoloring image 108 performs the recoloring operation for each of the color hue clusters identified by the image color analyzer 106 as including central colors within the distance threshold. In such an example, the image color analyzer 106 may identify that each of the input collage images 102 includes a red hued central color, a green hued central color, and a blue hued central color that are all within the distance threshold from respective central colors of the other input collage images 102. The recoloring image 108 performs the recoloring operation for each of the associated color hue clusters on each of the input color images 102. In another example, the recoloring engine 108 performs the recoloring operation for only a single color hue cluster (e.g., a red color hue for each of the input collage images 102). In such an example, the single color hue cluster may be recolored when only the single color hue cluster falls within the threshold distance, when the single color hue makes up more than 50% of the image, when a user requests a color that is close to the single color hue prior to performing operations of the image color analyzer 106, or when any other instruction provided by the image manipulation application 104 indicates that only the single color hue should be recolored by the recoloring engine 108.

The recolored images are subsequently provided to the placement engine 110 for placement into a collage. The placement engine 110 receives the recolored images and places the recolored images or portions of the recolored images into collage layout grammars. As used herein, the term "layout grammar" represents a positioning format in which the recolored images are placed to generate the recolored collage. In one embodiment, the placement engine 110 automatically selects the collage layout grammar based on characteristics of the recolored images. In another embodiment, the placement engine 110 presents a user with a selection collage layout grammars. When the collage layout grammar is selected automatically by the placement engine 110 or by manual user selection, an output recolored collage 112 is provided to the user.

Examples of Generating a Recolored Collage

Figure 2:
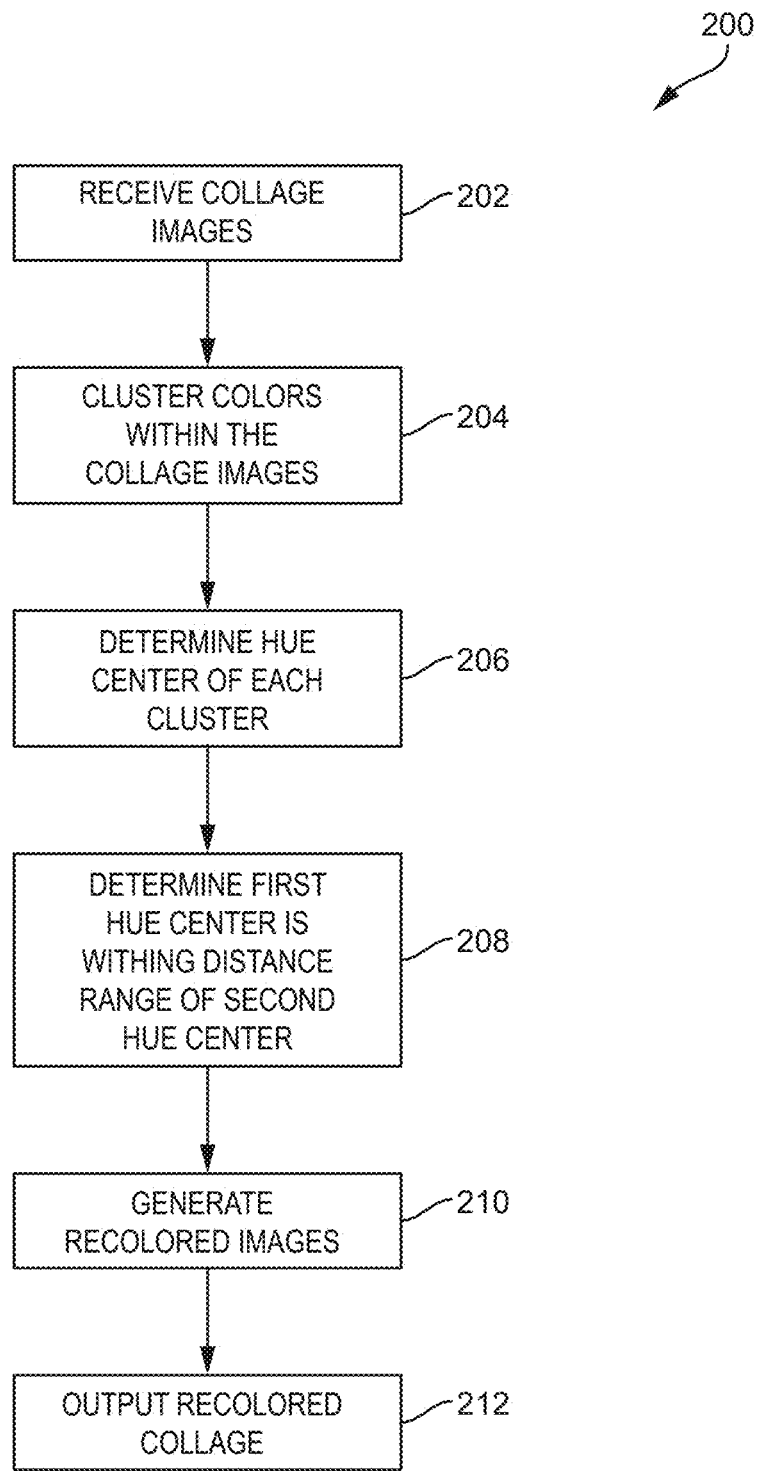
FIG. 2 depicts an example of a process for performing a recolored collage generation operation, according to certain embodiments of the present disclosure.

FIG. 2 depicts an example of a process 200 for generating a recolored collage using the input collage images 102. One or more processing devices implement operations depicted in FIG. 2 by executing suitable program code (e.g., the image manipulation application 104). For illustrative purposes, the process 200 is described with reference to certain examples depicted in the figures. Other implementations, however, are possible.

At block 202, the process 200 involves receiving the input collage images 102. One or more processing devices execute the image manipulation application 104 (or suitable other program code) to implement block 202. For instance, executing the image manipulation application 104 causes one or more processing devices to receive or otherwise access the input collage images 102 that are stored in a non-transitory computer-readable medium. In some embodiments, receiving or accessing the input collage images 102 involves communicating, via a data bus, suitable signals between a local non-transitory computer-readable medium and the processing device. In additional or alternative embodiments, receiving or accessing the input collage images 102 involves communicating, via a data network, suitable signals between a computing system that includes the non-transitory computer-readable medium and a computing system that includes the processing device.

At block 204, the process 200 involves clustering color hues within the input collage images 102. One or more processing devices execute the image manipulation application 104 to implement block 204. For instance, executing the image manipulation application 104 causes the image color analyzer 108 to cluster the color hues of each pixel of the input collage images 102. In an embodiment, the image color analyzer 108 performs a k-means clustering operation on each image of the input collage images 102 to segment color hues of each image into different clusters. The k-means clustering operation clusters each pixel of each of the input collage images 102 into k color hue clusters. The value of k varies based on how similar a user desires the original color hues of the recolored collage to be. For example, if the user desires a very narrow range of color hues to remain in the recolored collage, then the value of k may be greater than when the user desires a very broad range of color hues remaining in the recolored collage.

In an example, the value of k is set to 3 (e.g., a red hue cluster, a green hue cluster, and a blue hue cluster). In such an example, the k-means clustering operation performed by the image color analyzer 106 clusters all of the pixels of each of the input collage images 102 into one of three hue clusters based on the color associated with each pixel. The image analyzer 106 assigns each of the pixels to a hue cluster based on proximity of the pixel color to a representative color of the hue cluster.

To accomplish clustering, each pixel color is converted to a hue, saturation, lightness (HSL) representation of the pixel, and the HSL representation for each pixel is flattened to filter out the saturation and lightness elements of the HSL representation. This leaves the color hue portion of the HSL representation of the pixel. The image color analyzer 106 uses a k-means operation to determine a radial distance of the hue color of each pixel to a red hue color, a green hue color, and a blue hue color. Each pixel is then assigned to one of the three clusters based on which of the red, green, and blue hue colors is closest to the pixel hue color.

In an embodiment, the clustering operation is performed on a portion of one or more of the input collage images 102. For example, the image color analyzer 106 includes an image saliency analyzer. The image saliency analyzer generates a saliency mask for the input collage images 102 where manipulation based on the saliency of the input collage image 102 is desired. When clustering the input collage images 102 with the saliency mask, only the portions of the input collage images 102 identified as salient by the saliency mask are clustered. In an input collage image 102 that includes a person positioned in the foreground and scenery in the background, the image saliency analyzer generates the saliency mask that identifies the person as the salient portion of the image. In such an embodiment, only color hues of pixels representing the person are clustered into the color hue clusters for further manipulation.

At block 206, the process 200 involves determining a hue center of each hue cluster. One or more processing devices execute the image manipulation application 104 to implement block 206. For instance, executing the image manipulation application 104 causes the image color analyzer 106 to continue the k-means clustering operation to determine a hue center of each hue cluster of each of the input collage images 102. The hue center is represented by an average color of the pixels included within each hue cluster. In an example, when the pixels within the red hue cluster include a majority of orange hued pixels, the hue center of the red hue cluster skews toward an orange color.

At block 208, the process 200 involves determining that a first hue center of a first input collage image 102 is within a distance range of a second hue center of a second input collage image 102. For instance, executing the image manipulation application 104 causes the image color analyzer 106 to calculate distances between each of the hue centers of the input collage images 102 and comparing the distances to a distance threshold. In an embodiment, the distance threshold is set to 20 degrees. In such an embodiment, when comparing the hue centers of each of the input collage images 102, the image color analyzer 106 indicates that hue clusters associated with hue centers that are within 20 degrees of each other are viable candidates for the recolored collage. In comparing the distances between the hue centers and the distance threshold, the image color analyzer 106 makes a determination as to whether the hue clusters of different images are similar enough for an artistic emphasis in the recolored collage. As discussed above with respect to FIG. 1, other threshold distances are also anticipated based on how similar a user desires the remaining color hues of the recolored collage to be.

At block 210, the process 200 involves generating recolored images for each of the input collage images 102 that are within the distance range of the distance threshold, as detailed at block 208. For instance, executing the image manipulation application 104 causes the recoloring engine 108 to recolor the input collage images 102 that meet the distance threshold. In an embodiment, the recoloring engine 108 identifies a range of hues of each of the input collage images 102 that are within the hue cluster that meet the distance threshold. Using the range of hues, the recoloring image 108 maintains the pixels within the range of hues of the hue clusters that meet the distance threshold of each of the input collage images 102, and converts the remaining pixels of the input collage images 102 to grayscale, another color scale, or another color hue. For example, when the image color analyzer 106 determines that the hue centers of a blue hue cluster associated with each of the input collage images 102 are within the threshold distance from each other, the recoloring image 108 maintains a hue color of each pixel within each of the blue hue clusters of the input collage images 102 and converts the remaining pixels of the input collage images 102 to grayscale.

At block 212, the process 200 involves outputting the recolored collage 112. For instance, executing the image manipulation application 104 causes the placement engine 110 to place the recolored images generated at block 210 into a collage layout grammar and to output the recolored collage 112. As discussed in further detail below with respect to FIG. 6, in an embodiment, the placement engine 110 determines an appropriate layout grammar for the set of recolored images.

Figure 3:
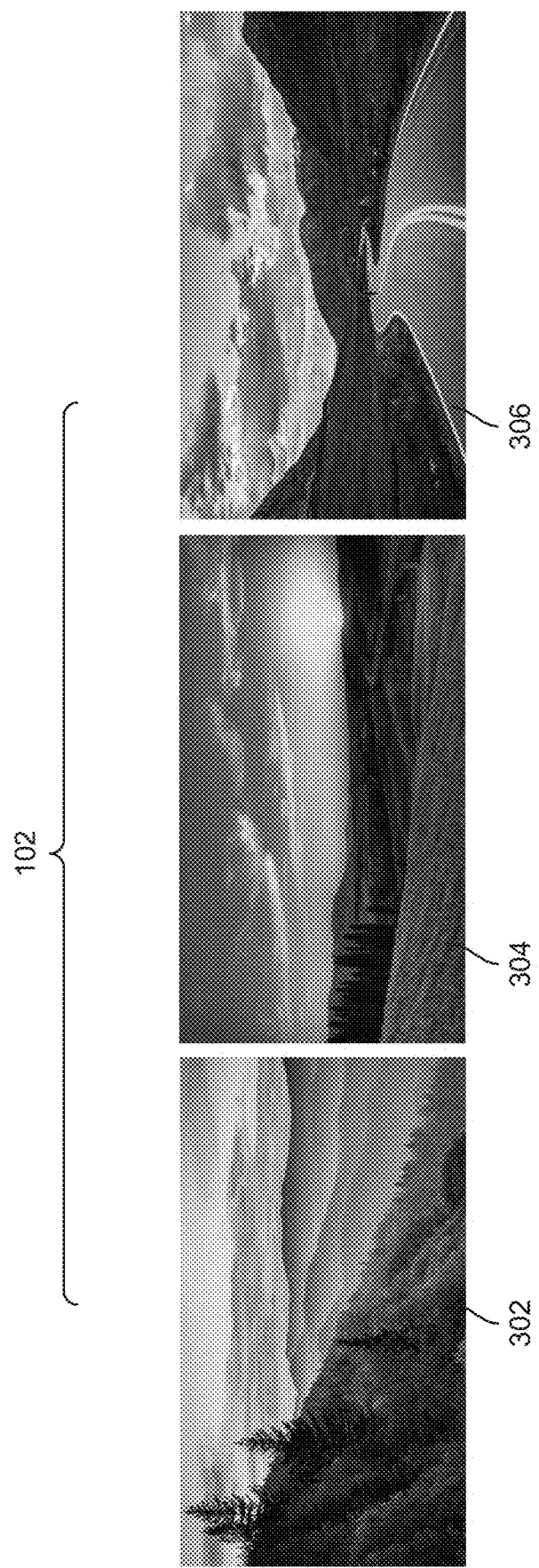
FIG. 3 depicts an example of input collage images used in a recolored collage generation operation, according to certain embodiments of the present disclosure.

FIG. 3 depicts an example of the input collage images 102 used in a recolored collage generation operation. The input collage images 102 include a first image 302 depicting a background of mountains and a foreground of trees. Additionally, the input collage images 102 include a second image 304 depicting grassy hills and a third image 306 depicting a mountainous area with a grassy valley and a road running through the grassy valley. As discussed above with respect to FIGS. 1 and 2, the images 302-306 are provided to the image manipulation application 104 for image color analysis and recolored collage generation.

Figure 4:
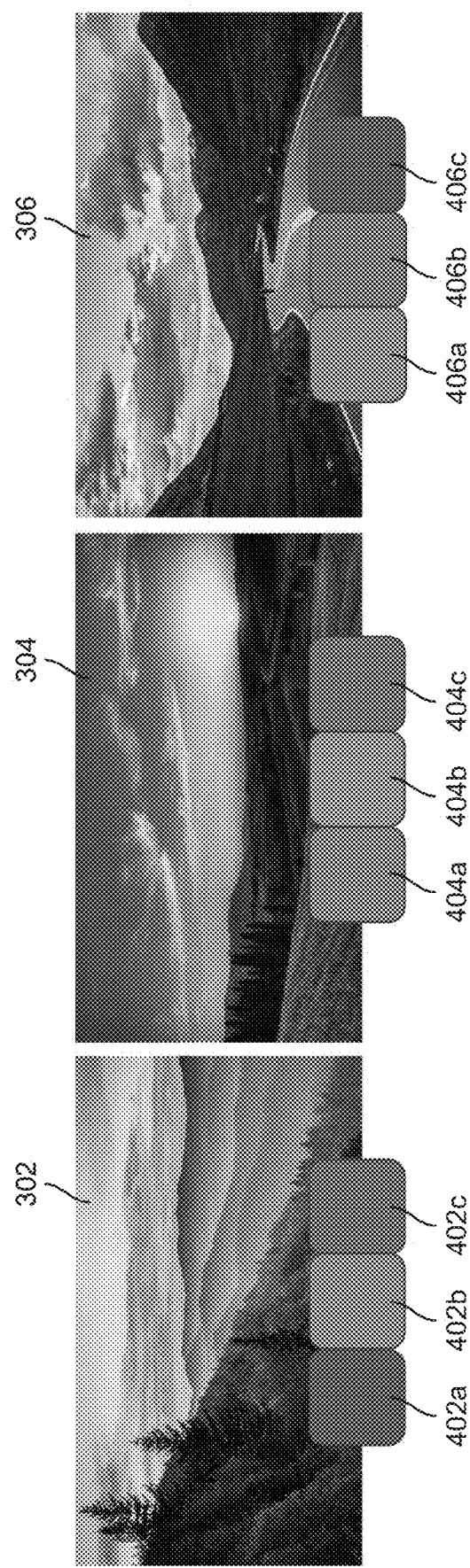
FIG. 4 depicts an example of the set of images of FIG. 3 with color hue clusters, according to certain embodiments of the present disclosure.

FIG. 4 depicts an example of the images 302-306 of FIG. 3 with associated color hue clusters. The image color analyzer 106 performs a k-means operation on the images 302-306 to cluster the pixels of the image. As illustrated, the k-means operation clusters the pixels of the images 302-306 into three separate clusters. The image 302 includes a red hued cluster 402a, a green hued cluster 402b, and a blue hued cluster 402c. The image 304 includes a red hued cluster 404a, a green hued cluster 404b, and a blue hued cluster 404c. The image 306 includes a green hued cluster 406a, a blue hued cluster 406b, and a red hued cluster 406c.

Each of the clusters are represented by a hue center color representation of each cluster 402a-406c. For example, the hue center color displayed as the red hued cluster 402a is different from the hue center colors displayed as the red hued clusters 404a and 406c. Such differences are a result of the different hue center location based on where most of the pixels within the hue clusters 402a, 404a, and 406c are located on the HSL color wheel while still falling within the red hue (e.g., closer to an orange color or closer to a red color). The other clusters 402b, 402c, 404b, 404c, 406a, and 406b are also represented by hue centers of varying shades.

The image color analyzer 106 measures distances between the hue centers across each image to determine whether the distances fall within the distance threshold. The closest hue centers are generally formed from the same hued clusters across the different images. For example, hue centers of the red hued clusters 402a, 404a, and 406c are likely closer in distance than hue centers of the red hued cluster 402a, the green hued cluster 404b, and the blue hued cluster 406b. However, in an embodiment where a hue center of the red hued cluster 402a approaches a magenta color and hue centers of the blue hued clusters 404c and 406b approach a blue-magenta color, the hue centers of the red hued cluster 402a and the blue hued clusters 404c and 406b may fall within the threshold distance for recoloring the images 302, 304, and 306 for use in the recolored collage 112.

Figure 5:
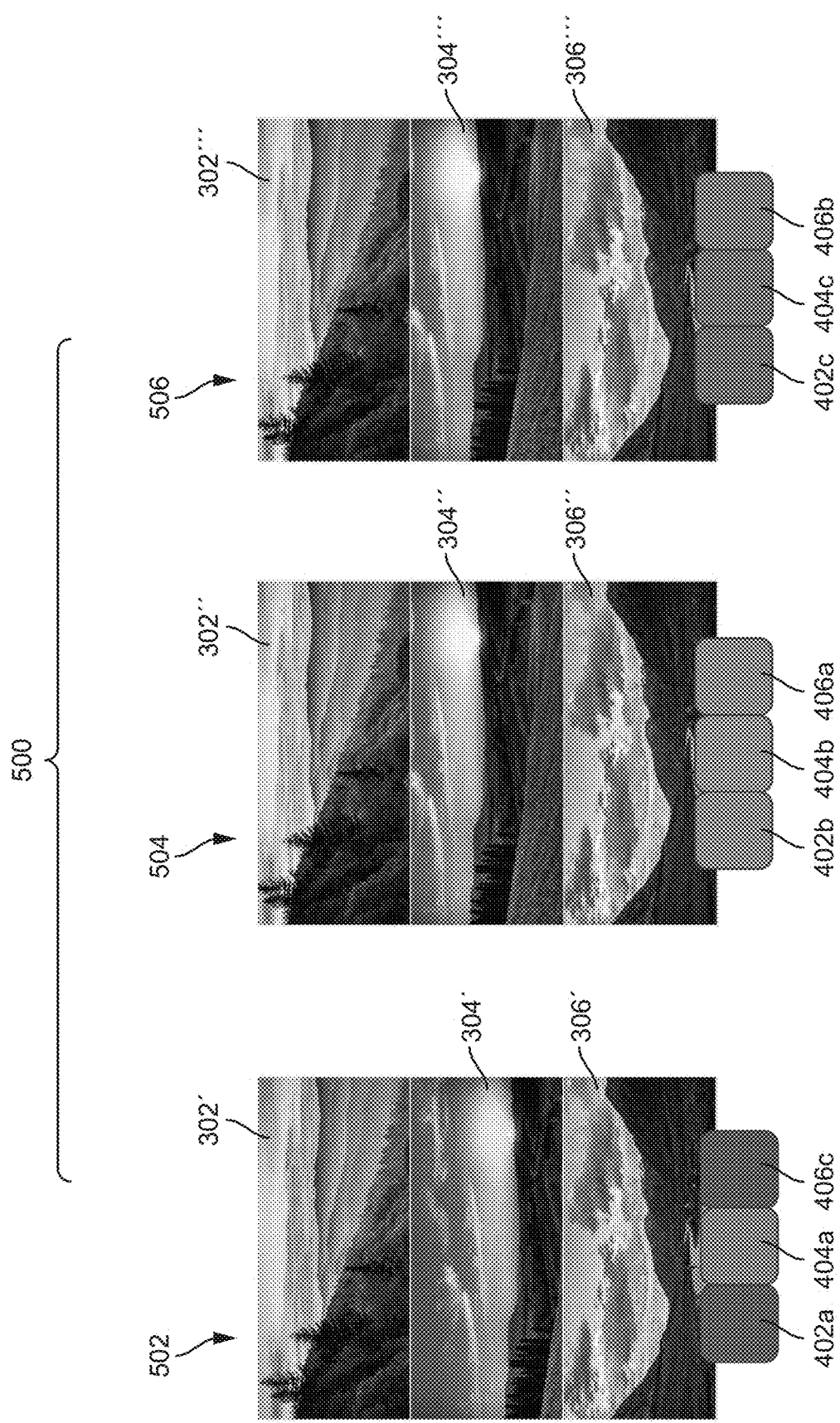
FIG. 5 depicts an example of a set of recolored collages based on the color hue clusters of FIG. 4, according to certain embodiments of the present disclosure.

FIG. 5 depicts an example of a set of recolored collages 500 based on the hued clusters 402a-406c. When the image color analyzer 106 identifies the hued clusters 402a-406c that fall within the threshold value, the recoloring image 108 recolors the images 302, 304, and 306 by maintaining a color of the pixels within the identified hued clusters 402a-406c and converting the remaining pixels to grayscale. Additionally, the placement engine 110 places the images into recolored collages 502, 504, and 506.

For example, a recolored collage 502 includes recolored images 302', 304', and 306' that were recolored to emphasize pixels displaying the red hued clusters 402a, 404a, and 406c while converting the remaining pixels to grayscale. In the recolored images 302', 304', and 306', the color of the pixels associated with a sunset (e.g., red and orange pixels) is maintained. A recolored collage 504 includes recolored images 302", 304", and 306" that were recolored to emphasize pixels displaying the green hued clusters 402b, 404b, and 406a while converting the remaining pixels to grayscale. In the recolored images 302", 304", and 306", the color of the pixels associated with trees and grass (e.g., the green pixels) is maintained. Further, a recolored collage 506 includes recolored images 302''', 304''', and 306''' that were recolored to emphasize pixels displaying the blue hued clusters 402c, 404c, and 406b while converting the remaining pixels to grayscale. In the recolored images 302''', 304''', and 306''', the color of the pixels associated with the sky (e.g., the blue pixels) is maintained.

Example of Collage Layout Grammar Selection

Figure 6:
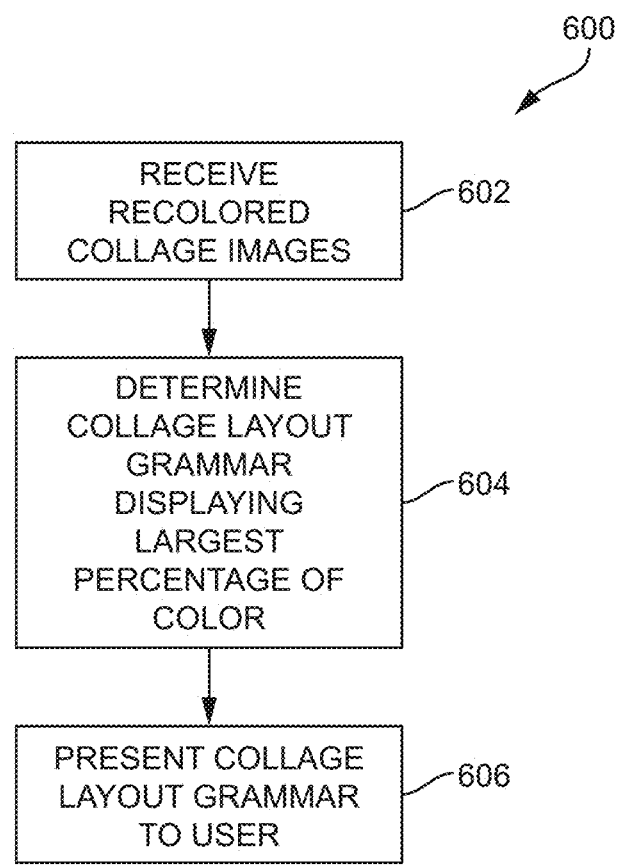
FIG. 6 depicts an example of a process for determining a layout grammar of the recolored collage, according to certain embodiments of the present disclosure.

FIG. 6 depicts an example of a process 600 for determining a layout grammar of the recolored collage 112. One or more processing devices implement operations depicted in FIG. 6 by executing suitable program code (e.g., the image manipulation application 104). For illustrative purposes, the process 600 is described with reference to certain examples depicted in the figures. Other implementations, however, are possible.

At block 602, the process 600 involves receiving the recolored collage images 302'-306', 302"-306", and/or 302"-306". For instance, executing the image manipulation application 104 causes the placement engine 110 to receive the recolored collage images. In an example, the recolored collage images are received upon completion of recoloring of the input collage images 102 by the recoloring engine 108.

At block 604, the process 600 involves determining a collage layout grammar displaying a largest percentage of color in the recolored images. For instance, executing the image manipulation application 104 causes the placement engine 110 to analyze a location of remaining color within the recolored images. Because the collage layout grammars may crop the recolored images or place portions of the recolored images over other recolored images, selecting the collage layout grammar that displays a largest percentage of color remaining in each of the recolored images provides the most emphasis on the remaining color of the recolored images. In another embodiment, the placement engine 110 selects a number of collage layout grammar options that represent a group of collage layout grammars that provide the largest percentage of remaining color.

At block 606, the process 600 involves presenting the collage layout grammar to the user. For instance, executing the image manipulation application 104 causes the placement engine 110 to display the selected collage layout grammar or the set of collage layout grammars to the user. In an embodiment, the placement engine 110 presents the selected collage layout grammar along with the recolored images as the recolored collage 112. In another embodiment, the placement engine 110 presents the selected collage layout grammar or the set of collage layout grammars for selection or approval. For example, the user is able to approve the selected collage layout grammar or decline to use the selected collage layout grammar. Should the user decline the selected collage layout grammar, the placement engine 110 presents the user with a new collage layout grammar that provides the second largest percentage of the remaining color of the recolored images. In an example where the placement engine 110 provides a set of collage layout grammars, the user is able to make a selectin from among that set of layouts.

Figure 7:
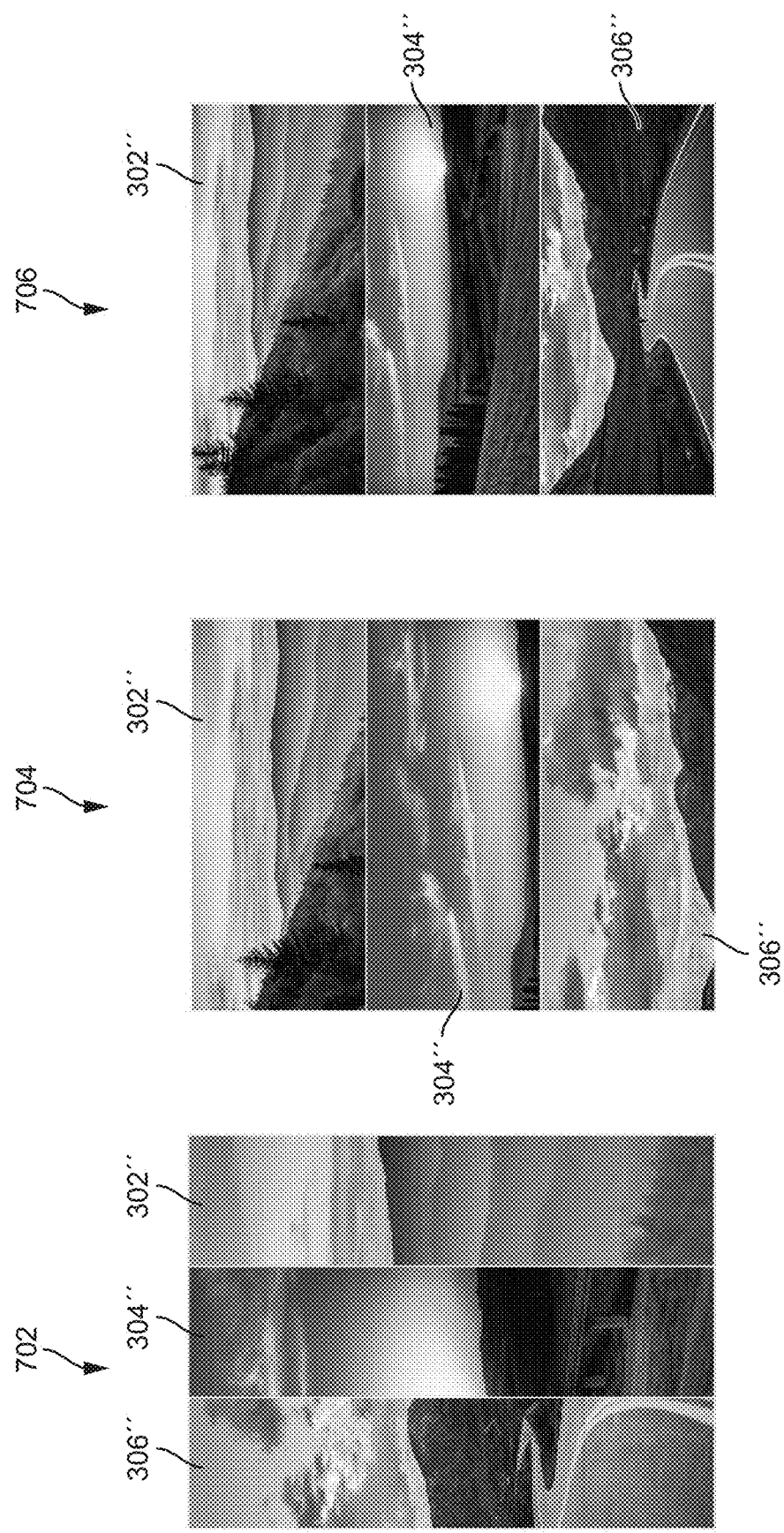
FIG. 7 depicts an example of a set of collage layout grammars, according to certain embodiments of the present disclosure.

To help illustrate the collage layout grammar selection process, FIG. 7 depicts an example of a set of collage layout grammars 702, 704, and 706. As illustrated, the collage layout grammars 702, 704, and 706 present the recolored images 302", 304", and 306" in different layouts. The recoloring engine 108 recolored each of the recolored images 302", 304", and 306" to maintain green colors that fall within the green hued clusters 402b, 404b, and 406a of the input collage images 102. Accordingly, the placement engine 110 may select from the collage layout grammars 702, 704, and 706 that include the most color from the green hued clusters 402b, 404b, and 406a.

The first collage layout grammar 702 provides rectangular sections of each of the recolored images 302", 304", and 306". Because the collage layout grammar 702 removes a significant amount of the green colored portions (e.g., trees and grass) of the recolored images 302", 304", and 306", a breadth of the recoloring effect on the recolored images 302", 304", and 306" is lost. Further, the second collage layout grammar 704 provides zoomed in portions of the recolored images 302", 304", and 306". With the zoom in function, the collage layout grammar 704 removes a significant amount of the green colored portions of the recolored images 302", 304", and 306", and a breadth of the recoloring effect on the recolored images 302", 304", and 306" is again lost. The third collage layout grammar 706, in contrast, depicts all or most of the green colored portions of the recolored images 302", 304", and 306". Accordingly, in an embodiment, the placement engine 110 automatically selects the collage layout grammar 706 for presentation to the user due to the collage layout grammar 706 having the largest percentage of the green colored portions among the available collage layout grammars 702-706.

Example of a Computing System for Executing an Image Manipulation Application

Figure 8:
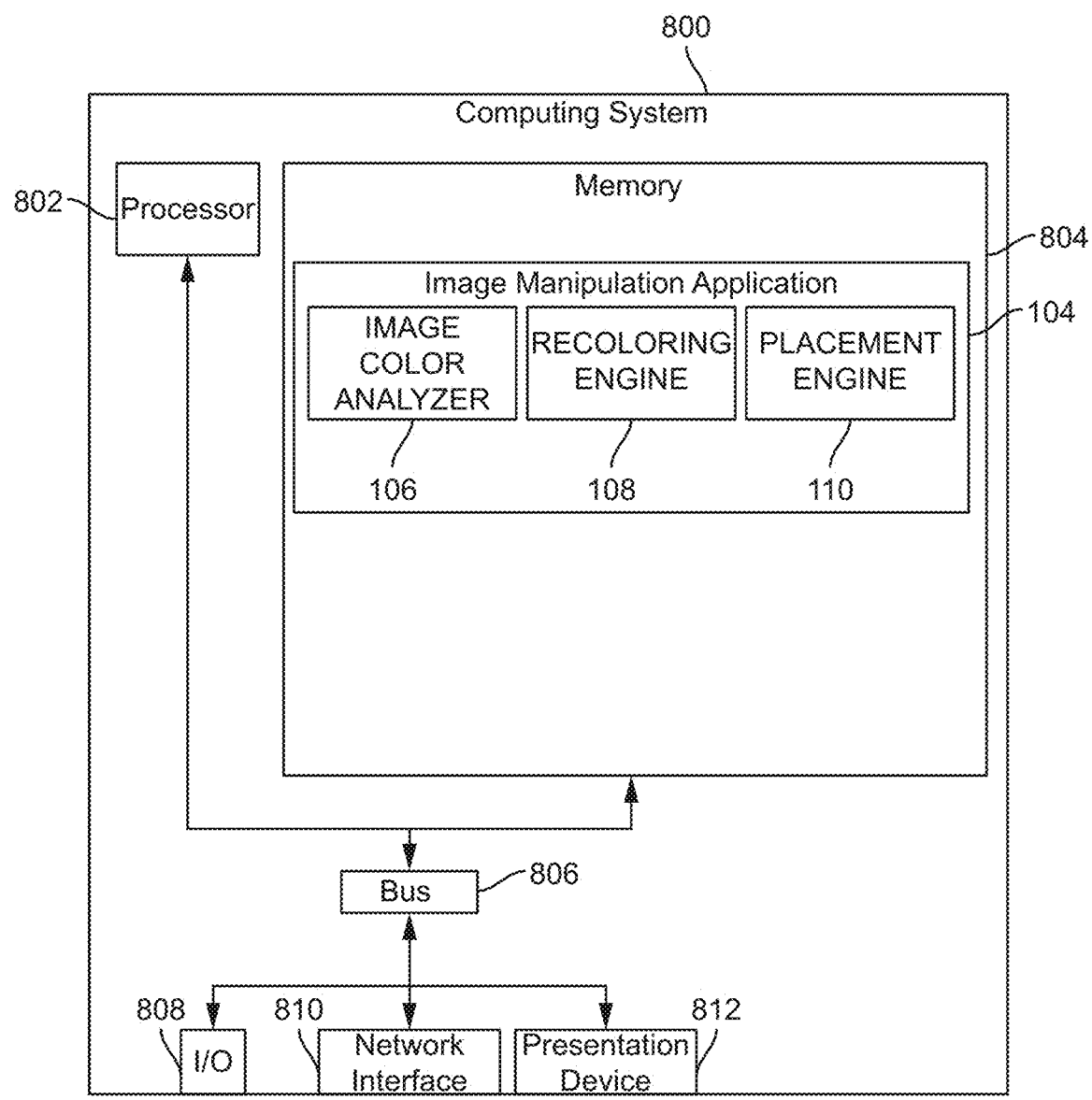
FIG. 8 depicts an example of a computing system for performing various operations described herein, according to certain embodiments of the present disclosure.

Any suitable computing system or group of computing systems can be used for performing the operations described herein. FIG. 8 depicts an example of a computing system 800 for performing various operations described herein, according to certain embodiments of the present disclosure. In some embodiments, the computing system 800 executes the image manipulation application 104, as depicted in FIG. 8. In other embodiments, separate computing systems having devices similar to those depicted in FIG. 8 (e.g., a processor, a memory, etc.) separately execute the image manipulation application 104.

The depicted example of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as input or output devices. For example, the computing system 800 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code that configures the processor 802 to perform one or more of the operations described herein. The program code includes, for example, the image manipulation application 104, the image color analyzer 106, the recoloring engine 108, the placement engine 110, or other suitable applications that perform one or more operations described herein. The program code may be resident in the memory device 804 or any suitable computer-readable medium and may be executed by the processor 802 or any other suitable processor. In additional or alternative embodiments, the program code described above is stored in one or more other memory devices accessible via a data network.

The computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices (e.g., a computing device executing an image manipulation application 104) via a data network using the network interface device 810.

In some embodiments, the computing system 800 also includes the presentation device 812. A presentation device 812 can include any device or group of devices suitable for providing visual, auditory, or other suitable sensory output. Non-limiting examples of the presentation device 812 include a touchscreen, a monitor, a speaker, a separate mobile computing device, etc. In some aspects, the presentation device 812 can include a remote client-computing device that communicates with the computing system 800 using one or more data networks described herein. Other aspects can omit the presentation device 812.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for modifying image content based on color information computed for a set of collage images, wherein the method includes one or more processing devices performing operations comprising:
   receiving a first image from the set of collage images and a second image from the set of collage images;
   grouping (i) a first set of color hues within the first image into a first color hue cluster and (ii) a second set of color hues within the second image into a second color hue cluster;
   determining that a first hue center of the first color hue cluster is within a distance range of a second hue center of the second color hue cluster;
   generating (i) a first recolored image by recoloring pixels of the first image having color hues outside the first color hue cluster and (ii) a second recolored image by recoloring pixels of the second image having color hues outside the second color hue cluster; and
   outputting a recolored collage comprising the first recolored image and the second recolored image.

2. The method of claim 1, the operations further comprising:
   converting the set of collage images to a hue, saturation, lightness (HSL) color space; and
   flattening the set of collage images in the HSL color space to remove saturation and lightness components.

3. The method of claim 1, wherein the first color hue cluster, the second color hue cluster, the first hue center, and the second hue center are computed using a k-means clustering operation.

4. The method of claim 3, wherein the k-means clustering operation comprises clustering the pixels of the first image into three different color hue clusters representing three ranges of color hues.

5. The method of claim 1, comprising:
   determining a collage layout grammar from a set of collage layout grammars that displays a largest portion of remaining original color hues located in the first recolored image and the second recolored image; and
   placing the first recolored image and the second recolored image in the collage layout grammar.

6. The method of claim 1, comprising:
identifying a salient area of the first image; and
grouping the color hues within the salient area of the first image into the first color hue cluster.

7. The method of claim 1, comprising:
grouping (i) a third set of color hues within the first image into a third color hue cluster and (ii) a fourth set of color hues within the second image into a fourth color hue cluster;
determining that a third hue center of the third color hue cluster is within a distance range of a fourth hue center of the fourth color hue cluster;
generating (i) a third recolored image by recoloring the pixels of the first image having color hues outside the third color hue cluster and (ii) a fourth recolored image by recoloring the pixels of the second image having color hues outside the fourth color hue cluster; and
outputting an additional recolored collage comprising the third recolored image and the fourth recolored image, wherein the additional recolored collage comprises a smaller portion of remaining original color hues of the first image and the second image than the recolored collage.

8. The method of claim 1, wherein the distance range comprises a 20 degree interval on a hue, saturation, lightness (HSL) color wheel.

9. A computing system comprising:
means for receiving a first image from a set of collage images and a second image from the set of collage images;
means for grouping (i) a first set of color hues within the first image into a first color hue cluster and (ii) a second set of color hues within the second image into a second color hue cluster;
means for determining that a first hue center of the first color hue cluster is within a distance range of a second hue center of the second color hue cluster;
means for generating (i) a first recolored image by recoloring pixels of the first image having color hues outside the first color hue cluster and (ii) a second recolored image by recoloring pixels of the second image having color hues outside the second color hue cluster; and
means for outputting a recolored collage comprising the first recolored image and the second recolored image.

10. The computing system of claim 9, comprising:
means for converting the set of collage images to a hue, saturation, lightness (HSL) color space; and
means for flattening the set of collage images in the HSL color space to remove saturation and lightness components.

11. The computing system of claim 9, wherein the first color hue cluster, the second color hue cluster, the first hue center, and the second hue center are computed using a k-means clustering operation, and wherein the k-means clustering operation comprises clustering the pixels of the first image into three different color hue clusters representing three ranges of color hues.

12. The computing system of claim 9, comprising:
means for determining a collage layout grammar from a set of collage layout grammars that displays a largest portion of remaining original color hues located in the first recolored image and the second recolored image; and
means for placing the first recolored image and the second recolored image in the collage layout grammar.

13. The computing system of claim 9, comprising:
means for identifying a salient area of the first image; and
means for grouping the color hues within the salient area of the first image into the first color hue cluster.

14. The computing system of claim 9, comprising:
means for grouping (i) a third set of color hues within the first image into a third color hue cluster and (ii) a fourth set of color hues within the second image into a fourth color hue cluster;
means for determining that a third hue center of the third color hue cluster is within a distance range of a fourth hue center of the fourth color hue cluster;
means for generating (i) a third recolored image by recoloring the pixels of the first image having color hues outside the third color hue cluster and (ii) a fourth recolored image by recoloring the pixels of the second image having color hues outside the fourth color hue cluster; and
means for outputting an additional recolored collage comprising the third recolored image and the fourth recolored image, wherein the additional recolored collage comprises a smaller portion of remaining original color hues of the first image and the second image than the recolored collage.

15. The computing system of claim 9, wherein the distance range comprises a 20 degree interval on a hue, saturation, lightness (HSL) color wheel.

16. A non-transitory computer-readable medium having instructions stored thereon, the instructions executable by a processing device to perform operations comprising:
receiving a first image from a set of collage images and a second image from the set of collage images;
grouping (i) a first set of color hues within the first image into a first color hue cluster and (ii) a second set of color hues within the second image into a second color hue cluster;
determining that a first hue center of the first color hue cluster is within a distance range of a second hue center of the second color hue cluster;
generating (i) a first recolored image by recoloring pixels of the first image having color hues outside the first color hue cluster and (ii) a second recolored image by recoloring pixels of the second image having color hues outside the second color hue cluster; and
outputting a recolored collage comprising the first recolored image and the second recolored image.

17. The non-transitory computer-readable medium of claim 16, the instructions further executable by the processing device to perform operations comprising:
converting the set of collage images to a hue, saturation, lightness (HSL) color space; and
flattening the set of collage images in the HSL color space to remove saturation and lightness components, wherein the distance range comprises a 20 degree interval in the HSL color space.

18. The non-transitory computer-readable medium of claim 16, wherein the first color hue cluster, the second color hue cluster, the first hue center, and the second hue center are computed using a k-means clustering operation, and wherein the k-means clustering operation comprises clustering the pixels of the first image into three different color hue clusters representing three ranges of color hues.

19. The non-transitory computer-readable medium of claim 16, the instructions further executable by the processing device to perform operations comprising:
determining a collage layout grammar from a set of collage layout grammars that displays a largest portion of remaining original color hues located in the first recolored image and the second recolored image; and placing the first recolored image and the second recolored image in the collage layout grammar.

20. The non-transitory computer-readable medium of claim 16, the instructions further executable by the processing device to perform operations comprising:

grouping (i) a third set of color hues within the first image into a third color hue cluster and (ii) a fourth set of color hues within the second image into a fourth color hue cluster;

determining that a third hue center of the third color hue cluster is within a distance range of a fourth hue center of the fourth color hue cluster;

generating (i) a third recolored image by recoloring the pixels of the first image having color hues outside the third color hue cluster and (ii) a fourth recolored image by recoloring the pixels of the second image having color hues outside the fourth color hue cluster; and outputting an additional recolored collage comprising the third recolored image and the fourth recolored image, wherein the additional recolored collage comprises a smaller portion of remaining original color hues of the first image and the second image than the recolored collage.

\* \* \* \* \*